United States Patent Office 3,337,327
Patented Aug. 22, 1967

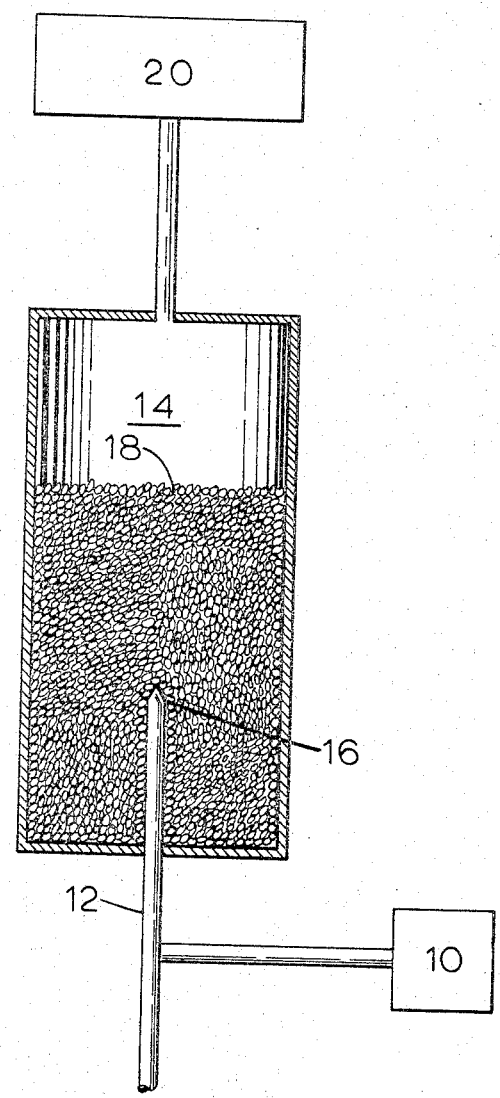

3,337,327
PROCESS FOR PRODUCING FINELY-DIVIDED METAL PRODUCTS
Merrill E. Jordan, Walpole, and John F. Hardy, Andover, Mass., assignors to Cabot Corporation, Boston, Mass., a corporation of Delaware
Filed Nov. 6, 1964, Ser. No. 409,513
16 Claims. (Cl. 75—.5)

This invention relates to a process for producing metallurgical materials. More precisely, the invention disclosed herein relates to an improved process for producing finely-divided metallurgical powders of submicron dimensions.

Finely-divided metallurgical powders including free metal, metal oxide and metal carbide powders are well known products of commerce. Such products presently have many known specialized applications and their potential applications are regarded as especially promising. Many processes are know for producing such metallurgical powders and in general, the fineness and purity of the ultimate powder is primarily determined by the process utilized. For example, the most finely-divided and purest powders are produced by elaborate and highly specialized ball milling techniques and also by vaporization of fuming techniques. Accordingly, the said powders are rather expensive because of the intricate processes involved in producing them. In view of the growing need for high purity metallurgical powders and especially those having average particle diameters below about one micron, any process whereby such powders can be produced consistently, easily and in a simple and inexpensive fashion would represent a notable and significant contribution to the art.

A principal object of the present invention is to provide finely-divided metallurgical powders, especially metal oxide powders, in an extremely economical fashion.

Another object of the present invention is to provide a simple process for producing powdered metals, or metal carbides in a finely-divided form.

Other objects and advantages of the present invention will in part be obvious to those skilled in the art and will in part appear hereinafter.

In a very broad sense, the above-mentioned objects and advantages are realized in accordance with the practice of our invention by subdividing a solution (or slurry or dispersion) containing at least one metal compound and introducing said sub-divided solution to a fluidized bed of carbon maintained at a temperature sufficiently elevated to convert said compound to at least the corresponding oxide. Thus, the principles of our invention reside not only in the ingredients and the form thereof utilized but also in the specific manner of subsequently converting said compound in a surprisingly facile fashion to a metallurgical powder.

The operational features of the present invention will be better understood by reference to the attached drawing. Said drawing illustrates a view in elevation of an arrangement of apparatus with portions of said apparatus cut away to illustrate features thereof in more detail.

Referring now to the attached drawing, a solution of the metal compound is conveyed, preferably at a controlled rate and in any convenient manner, such as with the aid of gas from reservoir 10, by means of conduit 12 to reactor 14. The terminal portion of conduit 12 is preferably equipped with a fine spray nozzle 16 so that said solution is subdivided and introduced in aerosol form to reactor 14.

Reactor 14 is an enclosed, heated chamber. Means for heating said chamber are not shown since many devices and methods obvious to those skilled in the art of heating said reactor directly or indirectly are applicable for the practice of our invention. The major portion of the interior of reactor 14 is occupied by a plurality of heated particulate carbon bodies 18 which are maintained in a "fluidized" state preferably by the gas from reservoir 10. In this respect, it is to be understood that auxiliary gas can also be introduced to reactor 14 through nozzle 16 or other entry ports to maintain bodies 18 in a fluidized state. It is also to be understood that the preferred fluidizing action should normally be so adjusted as to maintain attrition of bodies 18 at a minimum.

The sub-divided metal compound solution which is sprayed into reactor 14 contacts heated bodies 18 and is converted to the desired metallurgical powder. After conversion, since the powder is considerably smaller in size than bodies 18, the powder is selectively conveyed by the fluidizing gas from reactor 14 to suitable collection means 20.

It is to be understood that such features as the size of said bodies, the amount thereof in said reactor, the rate at which the solution (or slurry) is introduced to the reactor and the rate of gas flow through the reactor will vary and be determined by factors such as the temperature in the reactor, the geometry thereof, the metallurgical powder desired, the particle size of the powder desired, etc. However, suitable operational conditions for any given system can be readily determined by those well skilled in the art. For example, helpful details on fluidized bed systems can be found in Perry's Chemical Engineer's Handbook, 4th edition, sections 20–42 to 20–53.

We have found that the bed of carbon is an essential ingredient in effectuating the purposes of our process since even in those cases where carbon black is theoretically not required to produce the desired product, for example, in the production of metal oxides, the presence thereof normally permits the conversion of the metal compound to the desired corresponding metal powder to be achieved much more rapidly or at temperatures much lower than those normally required to accomplish said conversion in the absence of carbon black. Also, the use of a bed of carbon permits one to conveniently apply the practice of our invention to the direct production of diverse metallurgical powders, such as metal carbides, free metals, metal oxides and mixtures thereof. However, it is to be understood that the practice of our invention does not necessarily require that any of the aforesaid powders except the metal oxides be produced directly. In other words, the practice of our invention is normally satisfied by merely converting metal compounds to the corresponding oxides. Said oxides can then be treated in any desired fashion to convert said oxides to the corresponding free metal or carbide or mixtures thereof.

Broadly, the metal compounds utilized in the practice of our invention include compounds of metals such as boron, silicon, barium, copper, aluminum, titanium, zirconium, tungsten, zinc, lead, tin, iron, cobalt, nickel, manganese, chromium, vanadium, thorium, molybdenum and mixtures of these. More specifically, however, the present invention relates to metal compounds which can be thermally decomposed or converted in the substantial absence of free oxygen to produce the corresponding metal oxides. Representative preferred compounds include the sulfates, perchlorates, nitrates, orthoarsenates, acetates, citrates, oxalates, formates, benzoates, carbonates, tungstates, molybdates, oleates and tartrates of the above-mentioned metals. Especially preferred are the water soluble organic and inorganic compounds of the above-mentioned metals. The benefits which flow from the practice of our invention are especially apparent when compounds of the above-mentioned metals which can be converted to the desired metal powder at temperatures above about 400° F. and below about 2500° F. are utilized. Thus, such compounds constitute an especially preferred embodiment of our invention.

Any form of carbon such as carbon black, high purity fluid coke, charcoal, graphite, gas coke and other similar carbonaceous materials that are obvious to one skilled in the art are all generally suitable for the purposes of the present invention.

The temperature at which the metal compound will be converted to form the desired metallurgical product varies over a wide range. In general, the range includes temperatures substantially below those normally required to convert the metal compound alone as well as temperatures that can exceed said normal decomposition temperature by 400 or 500° F. and even more. Since our process is normally operated continuously, it is obviously desirable to reduce residence time to a minimum and thus the temperature of the conversion zone will be relatively high.

The environment in the conversion zone will also be determined primarily by the ultimate metallurgical product(s) desired and said environment can easily be selected by one well skilled in the art. For example, if the ultimate powder is to be a metal oxide, an inert environment is preferred. However, when the practice of our invention is applied to the direct production of powdered metals, metal/metal oxide mixtures, metal carbides, and metal/metal carbide mixtures, a reducing or inert environment is suitable. Oxidizing environments are usually undesirable because the carbon bed tends to be destroyed thereby.

The following specific examples of particular embodiments of our invention are given for the purposes of providing a fuller and more complete understanding of some of the operating details of the invention together with many of the advantages to be obtained from practicing same. These examples should be considered as illustrative only and as in no sense limiting the scope of the present invention.

*Example 1*

In apparatus of the type set forth in the attached drawing, an aqueous solution of nickel sulfate comprising 25% by weight nickel sulfate is entrained in nitrogen gas under a pressure of about 50 lbs./sq. in. and is continuously conveyed at a rate of about 10 lbs./hr. into externally heated reactor 14 containing 12 lbs. fluidized furnace carbon black pellets having an average particle diameter of about 500 microns. The average temperature of the fluidized mass is maintained at about 1500° F. The settled depth of the mass of furnace carbon black pellets making up the bed is about 2 feet, the average velocity of the gas through said bed being about 7 ft./second. A finely-divided composition comprising nickel oxide is continuously collected in a cyclone communicating with the upper discharge end of said chamber.

Electron microscope examination of said composition reveals that the particle size of substantially all of said composition is in the sub-micron particle range.

*Example 2*

In the same apparatus utilized in Example 1, an aqueous solution of titanium sulfate comprising 20% by weight titanium sulfate is entrained in $CO_2$ under a pressure of about 50 lbs./sq. in. and is continuously conveyed at a rate of about 15 lbs./hr. into the externally heated reactor containing about 25 lbs. of fluidized furnace carbon black pellets having an average particle diameter of about 300 microns. The average temperature of the fluidized mass is maintained at about 2000° F. The settled bed depth of the mass of furnace carbon black pellets is about 2.5 ft., the average velocity of the gas through said bed being about 8 ft./second. A finely-divided composition comprising titanium dioxide is collected in a cyclone communicating with the upper discharge end of said chamber.

*Example 3*

In the same apparatus utilized in Example 1, an aqueous solution of iron-sulfate, comprising 30% by weight iron sulfate is entrained in carbon monoxide under a pressure of about 50 lbs./sq. in. and is conveyed into the externally heated reactor containing 35 lbs. of fluidized thermal carbon black pellets having an average particle diameter of about 450 microns. The average temperature of the fluidized mass is maintained at about 1800° F., the average velocity of the gas through said bed being about 10 ft./second. A finely-divided composition comprising iron metal is continuously collected in a cyclone communicating with the upper discharge end of said chamber.

*Example 4*

In the same apparatus utilized in Example 1, an aqueous solution of ammonium paratungstate comprising 20% by weight ammonium paratungstate is entrained in argon gas under a pressure of about 50 lbs./sq. in. and is conveyed into the externally heated recator contaning 25 lbs. of fluidized furnace carbon black pellets having an average particle diameter of about 500 microns. The average temperature of the fluidized mass is maintained at about 2200° F., the average velocity of the gas through said bed being about 8 ft./second. A finely-divided composition comprising tungsten carbide is continuously collected in a cyclone communicating with the upper discharge end of said chamber.

It will be obvious from the preceding examples that the process of our invention is highly versatile and can be applied to the production of many finely-divided metal powders of commercial interest. Thus, many modifications in many of the incidental features utilized in illustrating our invention can be made without departing from the spirit and scope thereof.

For example, while most of our discussion above has been limited to metal compounds solutions, for the purposes of the present specification and the claims appended hereto, the term, "solution" includes within its scope the terms "slurry" and "dispersion."

Also, it is obvious that, if desired, flue gases, for example, from carbon black-producing units can be utilized in place of the fluidizing and/or entrainment media utilized above.

Having described our invention together with preferred embodiments thereof, what we declare as new and desire to secure by U.S. Letters Patent is as follows:

1. A process for producing finely-divided metallurgical powders comprising the steps of:
   (a) preparing a solution of at least one metal compound which upon heating in the substantial absence of oxygen can be converted to the corresponding oxide,
   (b) subdividing said solution into droplets and concontacting said droplets with a plurality of particulate carbon bodies heated to a temperature at least sufficient to convert said metal compound to the corresponding oxide.

2. The process of claim 1 wherein said metal compound is chosen from the group consisting of compounds of boron, silicon, copper, barium, aluminum, titanium, zirconium, tungsten, zinc, lead, tin, iron, cobalt, nickel, manganese, chromium, vanadium, thorium, molybdenum and mixtures thereof.

3. The process of claim 1 wherein said metal compound is a compound of iron.

4. The process of claim 1 wherein said metal compound is a compound of nickel.

5. The prcoess of claim 1 wherein said metal compound is a compound of tungsten.

6. The process of claim 1 wherein said metal compound is a compound of titanium.

7. The process of claim 1 wherein said metal compound is a compound of aluminum.

8. The process of claim 1 wherein step (b) is accomplished in an inert atmosphere.

9. The process of claim 1 wherein step (b) is accomplished in a reducing atmosphere.

10. The process of claim 1 wherein step (b) is accomplished at temperatures between about 400° F. and about 2500° F.

11. The process of claim 1 wherein said metal compound is chosen from the group consisting of sulfates, nitrates, acetates, tungstates and molybdates.

12. The process of claim 1 wherein a mixture of metal compounds is utilized.

13. The process of claim 1 wherein a metal oxide is produced.

14. The process of claim 1 wherein a free metal is produced.

15. The process of claim 1 wherein a metal carbide is produced.

16. The process of claim 1 wherein said particulate carbon bodies comprise pellets of carbon black.

References Cited
UNITED STATES PATENTS

| | | | |
|---|---|---|---|
| 2,242,759 | 5/1941 | Schlect et al. | 75—89 |
| 2,429,721 | 10/1947 | Jahnig | 75—.5 |

DAVID L. RECK, *Primary Examiner.*

W. W. STALLARD, *Assistant Examiner.*